(12) United States Patent  
Mehr

(10) Patent No.: US 8,752,342 B1  
(45) Date of Patent: Jun. 17, 2014

(54) GREEN RECYCLED MATERIAL COMPONENT WET WELL

(71) Applicant: Nasser Fred Mehr, Fort Lauderdale, FL (US)

(72) Inventor: Nasser Fred Mehr, Fort Lauderdale, FL (US)

( * ) Notice: Subject to any disclaimer, the term of this patent is extended or adjusted under 35 U.S.C. 154(b) by 0 days.

(21) Appl. No.: 13/691,418

(22) Filed: Nov. 30, 2012

(51) Int. Cl.  
*E04B 1/98* (2006.01)

(52) U.S. Cl.  
USPC .......................... 52/167.7; 52/157; 220/567.1

(58) Field of Classification Search  
USPC ............. 52/157, 167.7; 220/565, 567.1, 4.12, 220/4.13; 248/156, 545  
See application file for complete search history.

(56) References Cited

U.S. PATENT DOCUMENTS

| | | | | | |
|---|---|---|---|---|---|
| 4,492,493 | A | * | 1/1985 | Webb | 405/172 |
| 4,715,513 | A | * | 12/1987 | Shelton, Jr. | 220/560.03 |
| 5,806,702 | A | * | 9/1998 | Sabo | 220/4.12 |
| 7,624,892 | B2 | * | 12/2009 | Daley et al. | 220/565 |

* cited by examiner

*Primary Examiner* — Brian Glessner  
*Assistant Examiner* — Daniel Kenny

(57) ABSTRACT

A wet well design that utilizes recycled material in sectional components to construct wet wells on site is disclosed. Traditional wet well components are made of pre-cast concrete. Green Recycled Material Component Wet Well components are constructed using recycled plastic, recycled steel and recycled Styrofoam. The method described herein for constructing the components and assembling the wet well on site addresses several logistical problems associated with the pre-cast concrete design including reducing project start to completion time, delivery costs, large crane rental costs and power line relocation costs. This design also enables construction of oblong wet wells in medians and other restricted areas as components can be straight or curved sections. Finally, this design eliminates the shifting of traditional cement well components due to uplift from underground water pressure through the use of a new anchoring system. Shifting can result in groundwater intrusion into the well.

7 Claims, 13 Drawing Sheets

GREEN RECYCLED MATERIAL  
COMPONENT WET WELL

VERTICAL CROSS SECTION OF MODULE "H"

VERTICAL CROSS SECTION OF MODULE "M" & "L"

FOUR HATCHES - ALUMINUM

THREE HATCHES - ALUMINUM

FOUR HATCHES - CONCRETE

THREE HATCHES - CONCRETE

DIFFERENT CONFIGURATIONS OF HATCHES
FIGURES 3A, 3B, 3C, & 3D

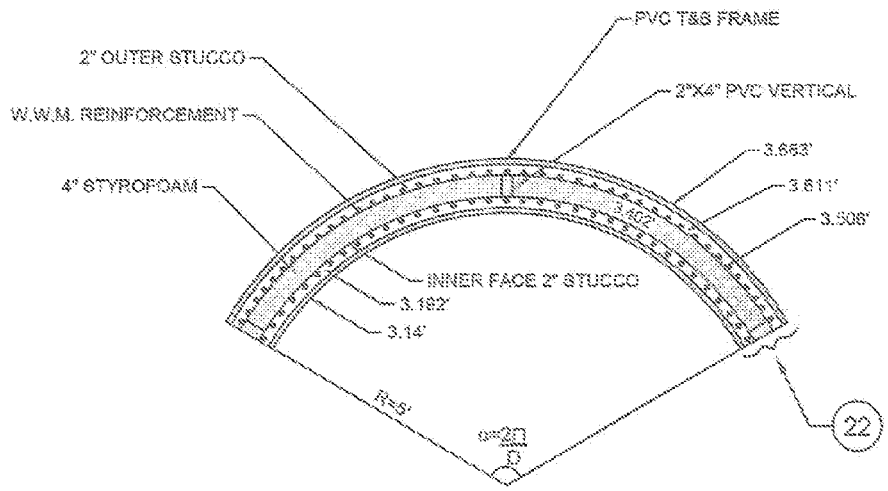
MODULE "H" WITH 8" WALL
FOR DI = 10'
FIGURE 4A
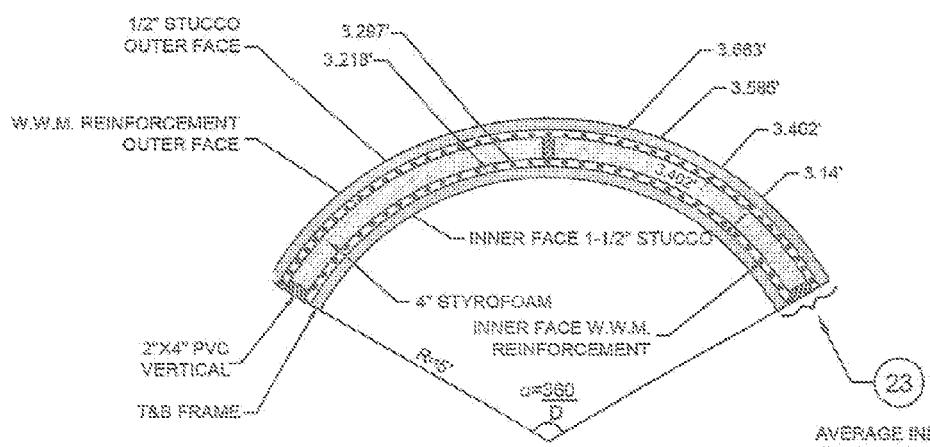
MODULE "M" & "L" WITH 7" WALL
FOR DI = 10'
FIGURE 4B
HORIZONAL WET WELL CROSS SECTION VIEWS
FIGURES 4A & 4B

HORIZONTAL & VERTICAL STRESS
ON WET WELL

PRIOR ART
BUOYANCY IN TRADITIONAL WET WELLS

ANCHOR PARTS

PLAN (TOP) VIEW

SIDE VIEW

GREEN RECYCLED MATERIAL
COMPONENT WET WELL

VERTICAL MEMBER 90° CUT

VIEW OF STACKED CIRCULAR MODELS

WALL UNIT SEGMENTS IN STACKED CYLINDERS
CROSS REFERENCE AA FOR SIDE VIEW
CROSS REFERENCE BB FOR TOP VIEW

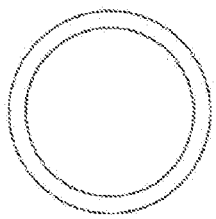
CROSS SECTION'S TOP VIEW
CIRCULAR WET WELL
FIGURE 12A
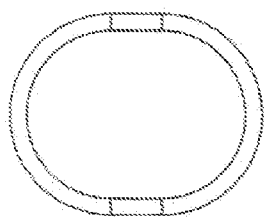
CROSS SECTION'S TOP VIEW
OVAL WELL
FIGURE 12B
CIRCULAR AND OVAL WET WELLS
TOP VIEWS
FIGURES 12A AND 12B

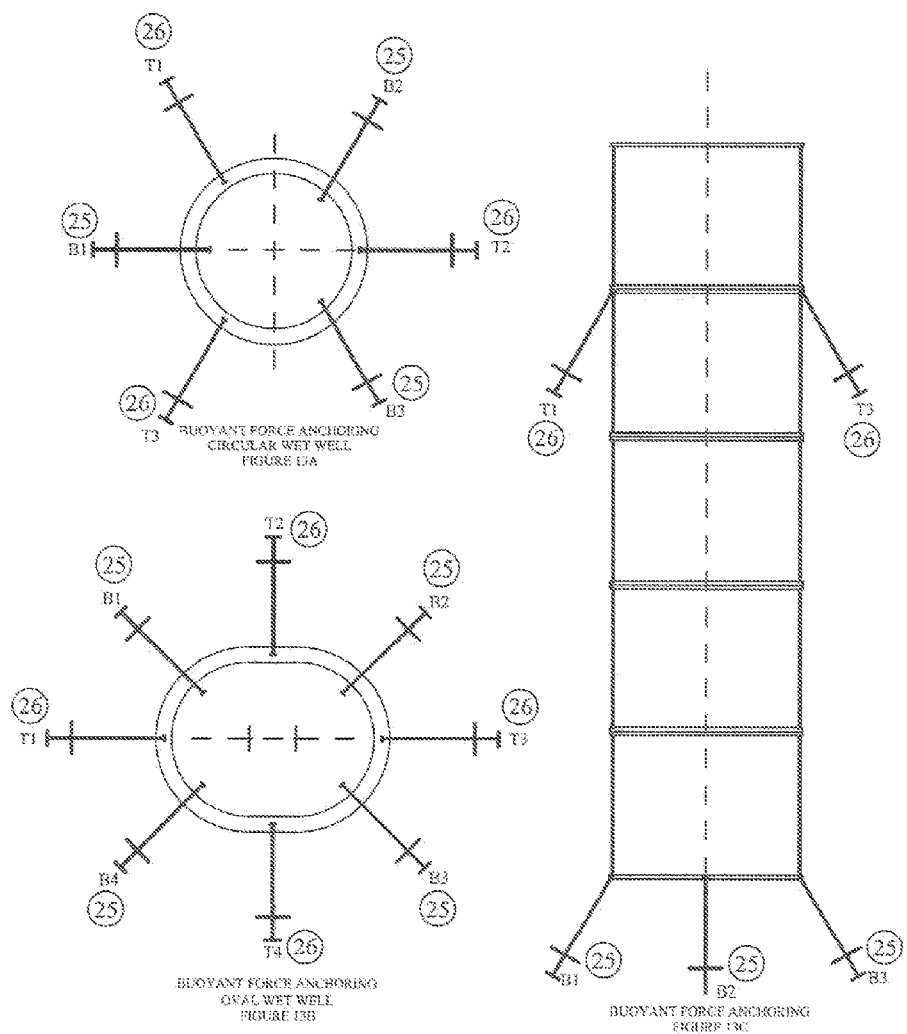
ANCHOR PLACEMENT IN
CIRCULAR & OVAL WET WELLS
FIGURES 13A, 13B, & 13C

GREEN RECYCLED MATERIAL COMPONENT WET WELL

BACKGROUND OF THE INVENTION

1. Field of the Invention

The present invention relates to waste water wet wells and more specifically to a design for the construction of wet wells using recycled materials and a mechanical anchoring system.

2. Description of the Related Art

In the construction of waste water wet wells, pre-cast concrete cylinders and concrete slabs are the traditional components.

The design of the Green Recycled Material Component Wet Well introduces an environmental friendly method of constructing wet wells through the use of recycled discarded materials in the construction of waste water wet wells that are primarily constructed underground. The materials include:

a) all plastic discarded from plastic products (recycled plastic),
b) discarded Styrofoam (polystyrene plastic) from packaging, cups, plates and other uses,
c) crushed auto body and truck steel scraps in the form of welded wire mesh.

The Green Recycled Material Component Wet Well is greener than green because it recycles recyclables. Up to 80% of the material used to construct the wet wells comes from recycled products. Since the wet wells are underground and out of sight, materials that would be objectionable to architects for use on above ground projects due to color and surface finish are able to be used in this design. At the end of the useful life of the wet well, 80% of the recycled material is once again recyclable resulting in minimum environmental impact from disposal.

The Green Recycled Material Component Wet Well saves energy. Due to the low density of the materials used, energy consumed in the handling, transporting, loading and installing the wet well components consumes less than 50% of the energy consumed vs. each conventional pre-cast concrete wet well component. For example, a traditional pre-cast concrete wet well component having an 8 inch wall, an 8 foot diameter, a height of 10 feet and approximate weight of 20 tons requires the use of a 30 ton capacity crane to unload and install these concrete units at the well site. In comparison, the heaviest module (Module "H") used in the Green Recycled Material Component Wet-Well has an 8 inch wall, an 8 foot diameter, a 6 foot height and weighs 4.5 tons. Transporting 20 ton cement modules requires far more fuel than that used to transport the components for the 4.5 ton "H" module. Eliminating fuel consumption for transporting the 30 ton capacity crane to the job site adds to the energy savings. These "H" modules can be unloaded and installed on site using 5 ton mechanical hoists. The energy used in dismantling the Green Wet Well at the end of its useful life is only a small fraction of that required to dismantle and dispose of the traditional concrete well.

The Green Recycled Material Component Wet Well solves logistic problems at any site with significant cost savings. Wet wells are often located in congested areas with narrow streets and pedestrian sidewalks. These sites typically have high voltage overhead power lines installed to serve the community. When 30 ton cranes are required to install traditional concrete wet wells, the tall booms require overhead electrical wires to be rerouted resulting in very high power line relocation costs increasing the total project budget. In addition, since cooperation with power company staff is required throughout the process, those experienced in the art are aware of the related logistical delays that often occur and the resulting extended disruptions to neighborhood services. In other situations, multistory high rises having several levels of underground parking areas produce large quantities of irregular waste water. The practical solution is to install a wet well located in the lowest level of the building. If this wet well requirement is overlooked in the construction of the building and the need is realized after one or more floors have been constructed, the installation of pre-cast concrete is impossible due to parking garage ceiling height dimensions and limited access. In both cases, the Green Recycled Material Component Wet Well is the effective solution. The small sized components can be assembled and installed on site under overhead power lines using a five ton hoist eliminating the need for power line relocation and in the case of a hi-rise building, working within ceiling height restrictions.

The Green Recycled Material Component Wet Well is the only solution to other restricted sites as well. Often, wet well sites are restricted in one dimension in such a way that the installation of a conventional pre-cast concrete wet well with the desired diameter cannot be achieved. For example, many public sites are located in street medians and are restricted in one dimension. Green Recycled Material Component Wet Well components provide for oval cross section wet wells to be constructed where the short diameter is determined by the restricted site dimension while the long diagonal will be as required by the optimal number of pumps.

The Green Recycled Material Component Wet Well reduces delivery response time for construction orders. Pre-cast concrete requires an average of 10 to 30 days for scheduling and production response time. Concrete curing time is about 28 days. Loading, transporting and unloading concrete well components takes 2 to 3 days. The minimum time from order placement to delivery of the conventional cement components is 40 to 60 days. Green Wet Well components have storage capabilities and delivery sizes that enable them to be maintained as local shelf items, available for delivery in 3 to 5 business days.

Finally, recent testing of a major re-pump station revealed several problems with the traditional cement wet well design in all coastal areas that are at or near sea level. These locations are subject to buoyancy pressure from ground water saturation conditions. During times of heavy rains or flooding, wet wells experience sufficient force to lift vertical components in such a way as to allow ground water to infiltrate the wet well by separation of the components at the connecting joints. Residual infiltrated debris left between joints make infiltration continuous. Moreover, at the gravity sewer pipe point of entry to the wet well, the water seal will break due to the uplift movement creating a permanent infiltration location. This was confirmed by tests using measuring devices known by those skilled in the art that test inflow water to a wet well and outflow water from the wet well. The test returned data whereby outflow readings measurably exceeded inflow readings. In a contained environment, the measurements should be equal or rationally close. The variance was measurable to the point that financial loss to the processing facility was occurring because the clean ground water entering the wet well increased energy costs from pumping the additional waste water. The energy and chemical processing plant treatment costs increase due to the increase of incoming flow to the plant. Environmental effects result when treating pure ground water because additional chemicals treating clean ground water increase chemical production and usage. The Green Recycled Material Component Wet Well eliminates the separation of the joints through the use of mechanical fasteners that are part of this Green Recycled Material Component Wet Well design resulting in savings to governing agencies and less chemicals impacting the environment.

SUMMARY

In view of the deficiencies of traditional pre-cast cement wet wells described above, one objective of the present invention is to provide a design that utilizes recycled materials in the construction of wet wells.

It is a further objective of the present invention to provide components made of recycled materials for the construction of wet wells having significantly less weight than the traditional pre-cast cement wet well sections eliminating logistical problems associated with the cement wet well design.

It is a further objective of the present invention to provide components made of recycled materials for the construction of wet wells having an oblong shape in order to provide service in restricted areas.

Finally, it is an objective of this design to provide a mechanical fastener system that prevents the Green Recycled Material Component Wet Well from separating due to buoyancy forces occurring in all coastal areas where ground flooding could occur.

The design of the present invention stacks 2, 3, 4 and 5 modular cylinders for any required depth of 12 feet, 18 feet, 24 feet and 30 feet. The modular cylinders are made using recycled materials including Styrofoam. Reinforcing mesh, water proofing and protective paint are used on the interior and the exterior of the components. Various top and bottom slabs are used and discussed in the detailed description section.

BRIEF DESCRIPTION OF THE DRAWINGS

FIGS. 4A and 4B depicts horizontal cross section top views of Modules H, M & L having certain wall lengths and for 10 foot diameter wet wells according to certain aspects of the invention. Corresponding horizontal cut top views BB can be seen in FIGS. 11 and 12A and 12B.

FIGS. 12A and 12B show top views of a round wet well and an oval wet well respectively.

FIGS. 13A and 13B provide top cut views of the positioning of anchors in round and oval wet wells respectively. The positioning of the anchors is further depicted by the use of the letter "T" to represent the top anchors (ie. T1, T2, T3 and T4) with these anchors connecting to center of the wall unit segments and the letter "B" representing bottom anchors (ie. B1, B2, B3 and B4) with these anchors connected within the bottom slab of the wet well.

FIG. 13C depicts a frontal view of anchor positioning whereby T1 and T3 are connected to the bottom of the upper most wall unit segment and B1, B2 and B3 anchors are connected to the bottom slab. T2 is not shown but it's positioning is inferred.

DETAILED DESCRIPTION

The following legend is provided at the opening of this descriptive section for easy reference when abbreviations are found throughout the DETAILED DESCRIPTION section. While not completely exhaustive, any abbreviations or symbols not in the legend will be interpretable to those skilled in the art:

W.U.S. is a wall unit segment of a module
$D_i$ is the inner diameter of the module in feet
$D_o$ is the outer diameter of the well in feet
$D_{bs}$ is the wet well bottom slab diameter in feet
$D_m$ is the module mean of the inner and outer diameter in feet
t is the module wall thickness in feet
H is the depth of the module in feet
h is the thickness of the wet well bottom slab in feet
$\rho_c$ is the specific weight of concrete in air measured in lb/ft$^3$
$\rho_{cw}$ is the specific weight of concrete in water measured in lb/ft$^3$
$\rho_w$ is the specific weight of water measured in lb/ft$^3$
$\alpha$ is the symbol for angle
bx is Horizontal stress also known as "hoop" stress in lb/in$^2$
by is Vertical stress also known as "bending" stress in lb/in$^2$
$\vec{W}_{well}$ represents the weight of a wet well in lbs
$\vec{B}$ represents buoyant force in lbs
$\vec{F}_{UPL}$ represents uplift force on the modules, cylinder and wet well in lbs
$V_{conyard}^3$ is the volume of concrete in cubic yards
J is an index of 1 to 5 as indicated in Table 6 A (Tables 1A through 8C are located at the end of this DETAILED DESCRIPTION section)
L is the length of the straight wall in an oval wet well in feet
$(\rho_{w.U.S.})_J$ is the weight of the W.U.S. of a module that is installed at a depth of "J", where J can be 1, 2, 3 or 5 corresponding to depths of 6 ft, 12 ft, 18 ft, 24 ft and 30 ft of water.

$(\rho_{W.L.F.})_J$ is the weight of one linear foot of the straight wall having an installation depth of J $W_{i,J}^{lb}$ module is the structural weight of modules with inner diameter $D_i$ and installed at a depth of J where J can be 1, 2, 3, 4 or 5 corresponding to depths of 6 ft, 12 ft, 18 ft, 24 ft and 30 ft of water $w_{circular\ cylinder}^{lb}$ is the structural weight of a cylinder in lbs $w_{i,L}^{J}\ oval$ is the weight of oval modules with a circular diameter of $D_i$ and a length of L installed at a depth of J where J can be 1, 2, 3, 4 or 5 corresponding to depths of 6 ft, 12 ft, 8 ft, 24 ft and 30 ft of water in lbs $\vec{B}_{circular\ module}$ is the buoyant force on a circular module in lbs $\vec{B}_{oval}$ is the buoyant force on an oval module in lbs $\vec{F}_{module\ J\ uplift}$ is the uplift force on module J in lbs $\vec{F}_{oval(i,L,J)}$ is the uplift force on an oval module J with diameter $D_i$ and straight wall L installed to a depth of J in lbs Green Wet Well-Green Recycled Material Component Wet Well Structure (Herein after Also Referred to as the Green Wet Well FIG. 8)

The Green Wet Well FIG. 8 will be built by stacking 2, 3, 4 and 5 modular cylinders for any required wet well depth of 12', 18', 24' and 30'.

Modular Cylinder

Figure 1:
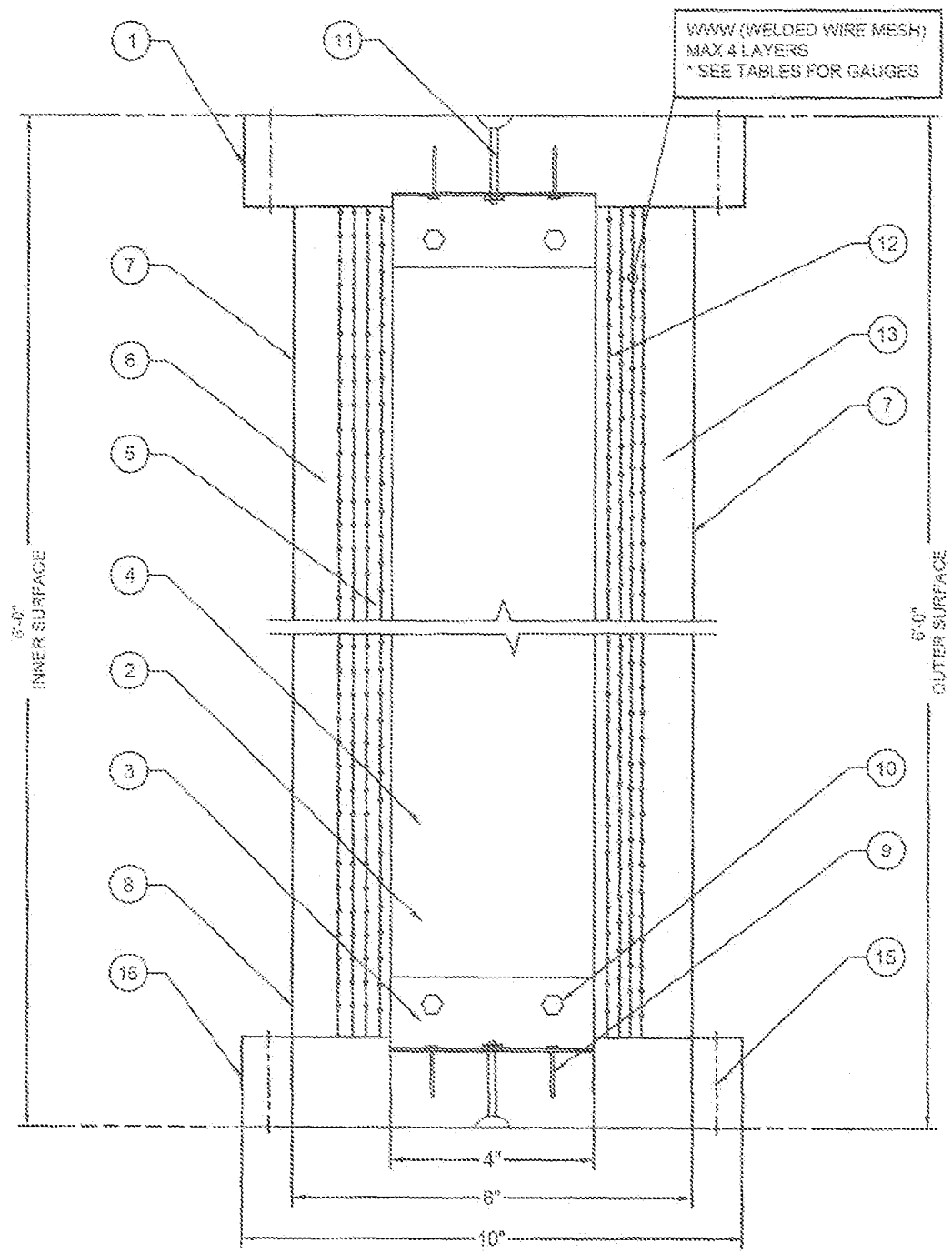
FIG. 1 is a vertical cross section view of Module H, one of three modules according to certain aspects of the invention (H=Heavy Module).
Figure 2:
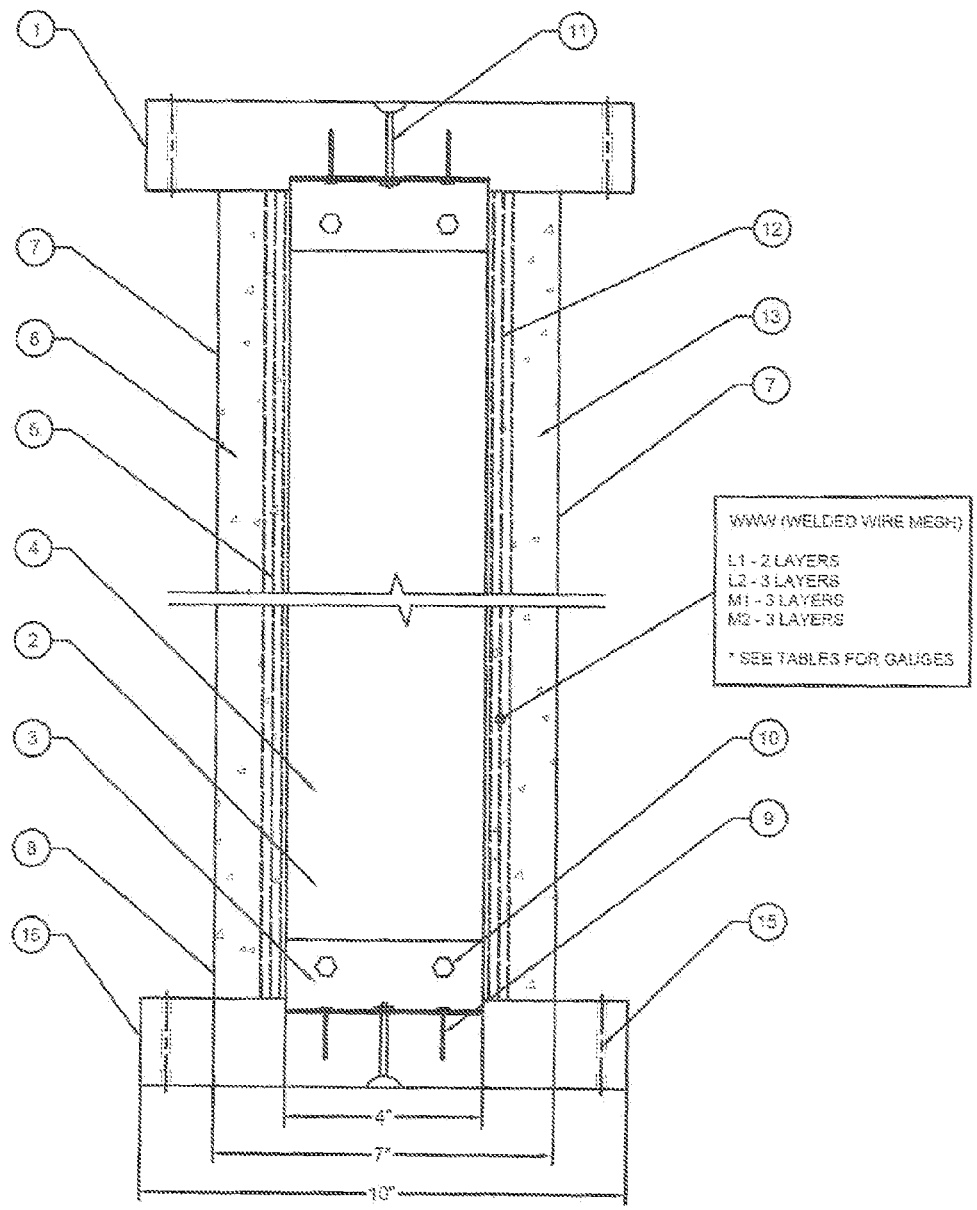
FIG. 2 is a vertical cross section view of Modules M & L, two of three modules according to certain aspects of the invention (M=Medium Module & L=Light Module; Table 1A shows the installation depths of Modules H, M & L).
Figure 10:
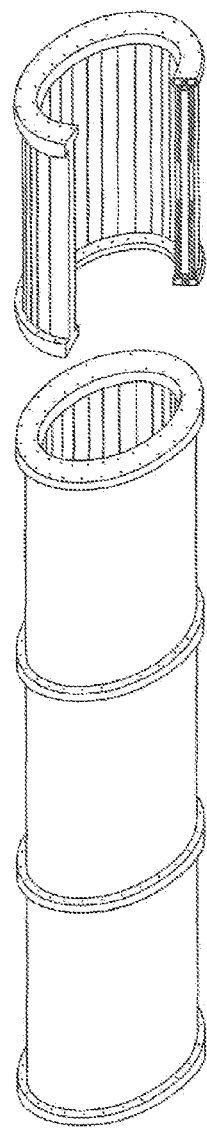
FIG. 10 depicts 3 stacked modules in a circular wet well. As shown in Table 1A, the positioning of the stacked modules is dependant on the installation depth of the individual module. The figure also lifts a module providing a general view as the one shown in FIG. 9.
Figure 11:
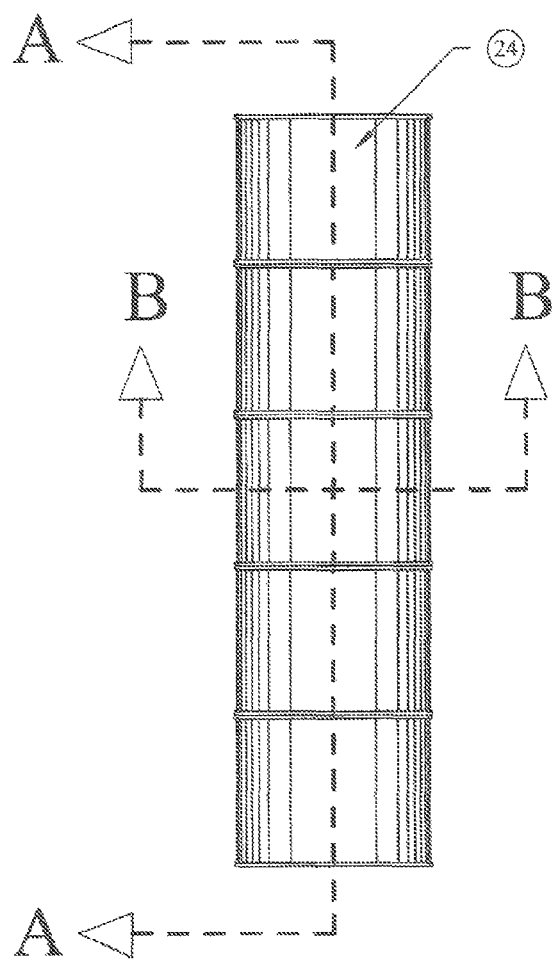
FIG. 11 identifies cuts across stacked cylinders and referenced component 24, the Wall Unit Segment, and the purpose is to provide insight into more detailed views depicted in FIGS. 4A & 4B and FIG. 9.

The modular cylinder is a unit of wet well construction. FIG. 1 is a cross section view of module H and FIG. 2 is a cross section view of modules M and L FIGS. 1 & 2. FIG. 10 depicts three stacked modular cylinders and a cross view of a single stacked cylinder above the three. Modular cylinders are constructed by assembling the components as detailed below. The depths at which Module H, Module M and Module L cylinders are stacked are provided in Table 1A.

Top and Bottom Frames

The top 1 and bottom 16 circular frames are identical and are made of recycled plastic with an inner diameter equal to that of the desired wet well diameter. Each top frame 1 and bottom frame 16 is made of frame sections. Each section has a length of 38 inches on the inner side. The number of these sections in each wet well will be equal to the number of feet in the diameter of the wet well. For example, eight sections are required for a wet well having an eight foot diameter.

Vertical Members

Vertical members 2 are made from recycled PVC material having dimensions of: width=2 inches, depth=4 inches and height=68½ inches. These vertical members 2 connect the top 1 and bottom 16 circular frames together. In each wet well, the number of vertical members 2 is twice the number of feet of its diameter. For example, 8 foot, 10 foot and 12 foot diameter wet wells would be constructed with 16, 20 and 24 vertical members 2 respectively. The verticals members 2 are placed in a 4 inch wide by ½ inch deep circular groove cut into the top 1 and bottom 16 circular frames. These members 2 will be installed at 18.85 inches (18⅞ inches) center to center of the inner circle of the frames 1 and 16.

Connecting Angles

Galvanized 2½ inch by 2½ inch by 3/16 inch angles 3 having a length of 3¾ inches with the necessary holes attach the top 1 and bottom 16 frames to the vertical members 2.

Space Refill

Space refill 4 is the space between the vertical members 2 that will be filled by pieces of high density, low quality (referring to the products color and surface finish so that recycled materials are used) Styrofoam. The Styrofoam occupies space refill 4 dimensions of 18 inches wide by 4 inches deep by 68 inches high and a curvature matching with 4 inch width by ½ inch groove for the top 1 and bottom 16 frames.

Inner Surface Reinforcement

Figure 5:
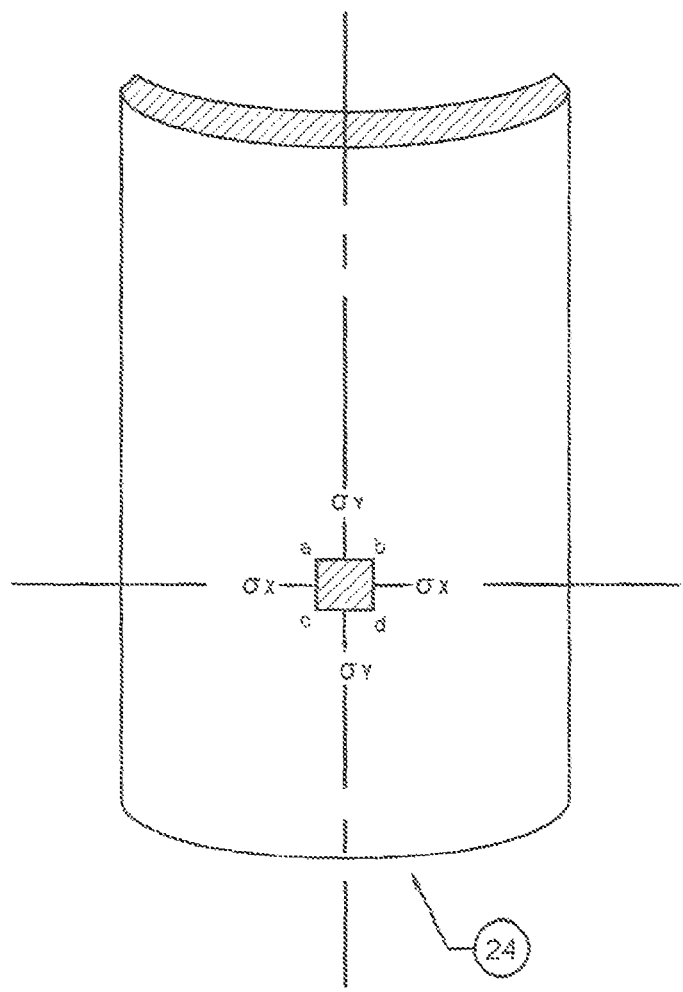
FIG. 5 depicts the horizontal and vertical tensile stress factors on H, M & L wall unit segments for the purpose of determining reinforcement requirements for modules discussed in the detailed description.

The inner surface reinforcement 5 is constructed from cold worked welded wire mesh with yield strength of 70,000 psi to 80,000 psi. The required reinforcement has been calculated and limited gauges have been selected to reduce the number of stacked items. The required reinforcement and related gauges for each Module H FIG. 1 and Modules M & L FIG. 2 are provided in design Tables 1A through 1E. Inner surface reinforcement 5 is applied to the vertical members 2 by staples or other suitable hardware. The reinforcement of the module FIGS. 1 & 2 is dependent on the horizontal force of water pressure acting horizontally and vertically on each element of the inner module FIGS. 1 & 2 surface. FIG. 5 shows the horizontal and vertical stress on a Wall Unit Segment (hereinafter W.U.S.) 24 of a module FIGS. 1 & 2. The W.U.S. 24 is a vertical slice of the wall. Stress and the W.U.S. 24 are discussed in detail later. At any point, the corresponding pressure is equal to the weight of the water column with the height equal to the distance of that point to the water surface. In an economical design, the required reinforcing criteria will change with the depth of the water. The reinforcement requirements for modules H in FIG. 1 and modules M and L in FIG. 2 are provided in Tables 1A through 1E.

Inside Cover

The inside cover 8 is a shield and protects the space refill 4 and supporting members 2 from physical damage, water penetration and deterioration of the inner surface reinforcement 5 by corrosive in-flow gases. The design engineer has several choices for the construction of the inner shield including:

A—Concrete Stucco

The simplest method is to apply an inner surface stucco layer 6 to the inner surface reinforcement 5. Stucco having a minimum 2 inch thickness for module H in FIG. 1 and 1½ inch minimum thickness for modules M & L in FIG. 2 is required. This thickness could be reduced to 1 inch if an inner protecting layer of stainless steel or epoxy coated galvanized sheet metal has been used. The stucco aggregate should be according to the following mix:

| AGGREGATE SIZE | DIAMETER 1/16" | DIAMETER 1/8" | DIAMETER 3/16" | DIAMETER 1/4" | TOTAL AS SEPARATE | TOTAL AS MIX |
|---|---|---|---|---|---|---|
| % BY VOLUME | 30% | 30% | 30% | 30% | 120% | 100% |

To make the structure watertight, the stucco should be rich in portland cement. The strength of the stucco should be 4000 psi or higher. The stucco should be applied to the structure by use of a high pressure stucco pump. Water proofing and protective paint 7 that is tar base or epoxy is to be applied to the inner surface stucco layer 6 to prevent corrosive elements from penetrating into the stucco and corroding the inner surface reinforcement 5.

B—Stainless Steel

One piece of plating that is minimum 36 gauge stainless steel of 316 or preferred 317 stainless steel grade with a full width of 6 feet to be secured to the inner one inch thick stucco surface 6 with stainless steel 316 grade self tapping screws or stainless steel tapcons. The attachment should be with 7 screws on each vertical 2 starting 3 inches from top 1 and bottom 16 frames with spacing 11 inches center to center.

C—Galvanized Sheet Metal & PVC

A layer of recycled PVC having a 1/16 inch minimum thickness is to be glued to one piece of hot deep galvanized sheet metal having a width of 6 feet and a minimum thickness of 24 gauge secured to the inner surface reinforcement 5 with stainless steel 316 grade set screws. The attachment should be with 7 screws on each vertical 2 starting 3 inches from top 1 and bottom 16 frames with spacing 11 inches center to center.

D—Galvanized Sheet Metal and Paint

A layer of hot deep galvanized sheet metal having a width of 6 feet and a minimum thickness of 24 gauge is to be secured to the inner surface reinforcement 5 with stainless steel 316 grade set screws. The attachment should be with 7 screws on each vertical 2 starting 3 inches from top 1 and bottom 2 frames with spacing 11 inches center to center. The inner sheet metal surface is to be sprayed with tar based or epoxy paint.

Angle Fastening Screws

Angle fastening screws 9 connect each vertical PVC member 2 to the top 1 and bottom 16 frames by way of the four angles 3 with a minimum of eight self tap screws 9 that are 1/4 inch diameter by 1 3/4 inch length with coarse pitch. These angle fastening screws 9 are the same in H module in FIG. 1 and M and L modules in FIG. 2.

Angle Bolt and Nut Fasteners

Angle bolts 10, nuts and washers fasten each vertical member 2 to the steel angles 3. There are to be four angle bolts 10, four nuts and eight 1/8 inch flat washers (two washers on each steel angle 3). The size of the angle bolt 10 should not be less than 3/8 inch diameter by 2 1/2 inch length.

Vertical Member Connecting Bolts

The vertical members 2 are connected to the top circular frame 1 and the bottom circular frames 16 by vertical member connecting bolts 11. The vertical member connecting bolts 11 are used to strengthen the connection of the top 1 and bottom 16 circular frames which are also connected to the vertical members 2 by the connecting angles 3 and the angle fastening screws 9. One vertical member connecting bolt 11 per angle is to be used. The dimensions of the bolts should not be less than 3/8 inch diameter by 2 1/4 inches. Four vertical member connecting bolts 11 are required per vertical member 2 as there are two connecting angles 3 that attach the bottom circular frame 16 to the bottom of the vertical member 2 and two that attach the top circular frame 1 to the top of the vertical member 2.

Outer Surface Reinforcement

The outer surface reinforcement 12 is similar to the inner surface reinforcement 5. Cold worked welded wire mesh with yield stress of 70,000 psi to 80,000 psi is to be used and is applied to the vertical members 2 using staples or other suitable hardware. The required reinforcement has been calculated and limited gauges have been selected to reduce the number of stocked items needed to be maintained in the inventory. The required reinforcement and related gauges for each module FIGS. 1 & 2 can be found in design Tables 1A through 1E. Design Tables 1 through 8 are found at the end of the detailed description section.

Outer Surface Stucco

The outer surface reinforcement 12 is to be covered with stucco 13 having a minimum application width of 2 inches for module H in FIG. 1 and 1 1/2 inches for modules M and L in FIG. 2. Refer to the composition of the stucco previously provided in the discussion above on application of the inner surface stucco layer 6 to the inner surface reinforcement 5.

Outer Surface Waterproofing and Protective Paint 7

Depending on the outer surface soil composition and underground water quality at the site, it may be necessary to spray the outside surface of the outer surface stucco layer 13 with a tar base or epoxy protective paint 7. This will provide the outside stucco surface water proofing and another protection layer.

Module FIGS. 1 & 2 Module Connecting Bolts

Modules FIGS. 1 & 2 are stacked on top of each other to achieve the design depth of the wet well. The stacked modules FIGS. 1 & 2 are connected by module connecting bolts 15. The module connecting bolts 15 are 3/8" diameter by minimum length of 4 1/2" with bolt and two flat washers. Modules are connected are connected horizontally, by any appropriate means, to form a complete circular cylinder. Circular cylinders can be round or oval in shape. The construction of circular wet wells consists of curved modules. The construction of oval wet wells consists of and straight modules and curved modules that form the oval circular cylinders.

Wet Well Top Slab

FIGS. 3A, 3B, 3C and 3D provides views of four different top slab with hatches. The final number of pumps and the wet well site conditions will dictate the design engineer's selection of the appropriate slab.

1—Rate of Flow in the Future

The projected increased rate of flow in the future helps the designing engineer to select a top slab with three or four hatches.

Figure 3A:
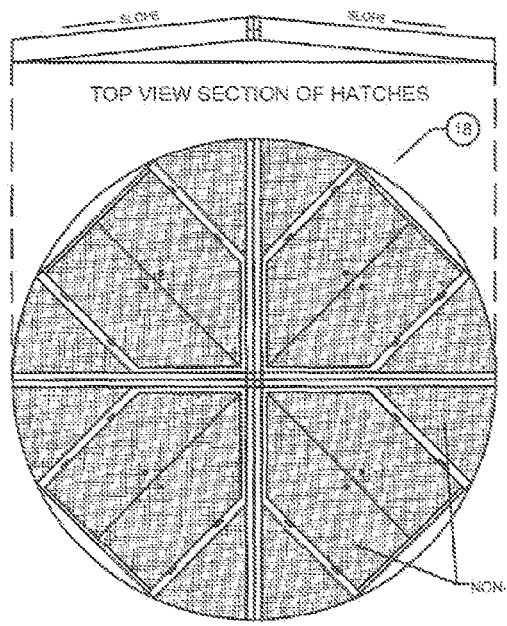
FIGS. 3A, 3B, 3C and 3D depicts different configurations of hatches to be applied in constructing the invention.
Figure 3B:
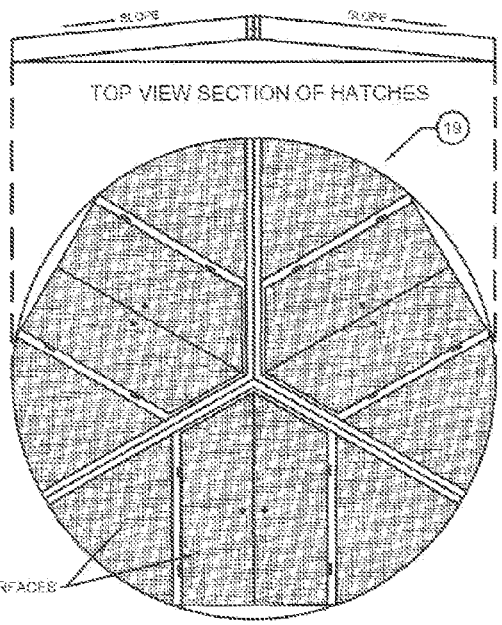
Figure 3C:
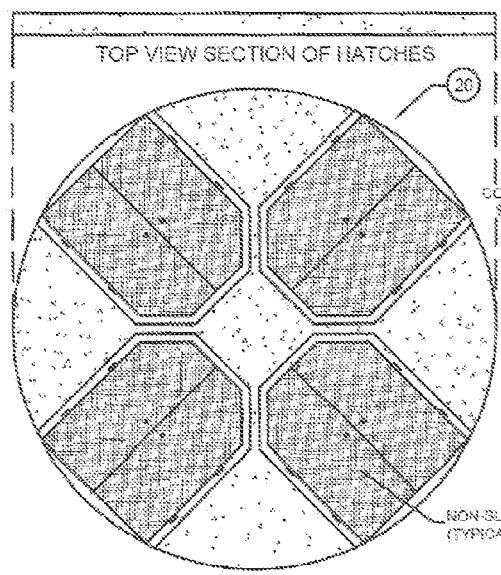
Figure 3D:
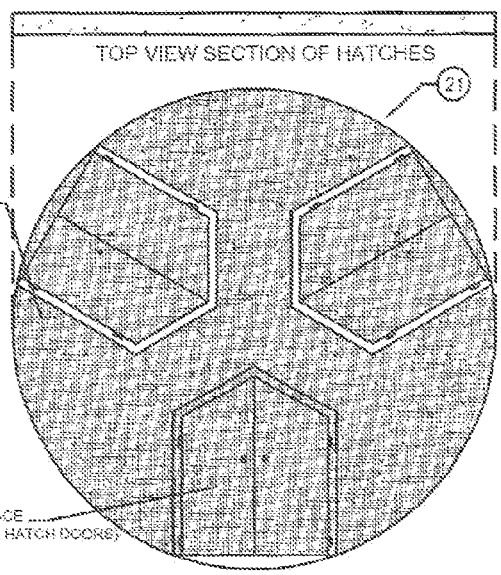

A—Aluminum three hatch top slabs 19 FIG. 3B and concrete three hatch top slabs 21 FIG. 3D serve lift-stations in well established areas having a relatively low rate of increase in in-flow when their installed pump capacity can handle the in-flow for 20 years into the future.

B—Aluminum four hatch top slabs 18 FIG. 3A or concrete four hatch top slabs 20 FIG. 3C should be used for all re-pump lift-stations and for stations with relatively high rates of increase in their in-flow. In these cases, the existing installed pump capacity cannot handle the future increases in in-flow and it is necessary to provide for the addition of an additional identical fourth pump. In adding the fourth pump, pumping capacity of the station will increase from 100% to 150%. This occurs when the initial station has 3 identical pumps and the operation is such that one pump runs continuously, a second pump is the support pump and the third pump is the emergency backup pump. So that pumps 1 and 2 provide 100% pump capacity and adding the $4^{th}$ pump increases capacity by 50%. The four hatch top slabs 18 and 20 provide for initial 3 pump construction where the fourth hatch provides for the addition of the fourth pump in the future without any construction renovation.

2—Site Restriction

Top slab construction is determined by assessing site restrictions and installation difficulties.

A—The traditional concrete slab works well in open access sites where the site is clear from existing overhead power lines and the use of a heavy crane to install the concrete slab is not restricted. The slab has a diameter of 8 feet to 12 feet, a thickness of 10 inches to 12 inches with a weight of 6,500 to 17,000 pounds. The top view of the concrete three hatch top slab 21 and the concrete four hatch top slab 20 is provided in FIGS. 3D and 3C respectively.

B—A light weight top slab is preferable in areas where heavy cranes do not have practical access without re-routing power lines and obtaining power company associated permits which can be time consuming and costly. A light weight top slab made from "H" shaped aluminum has a 5/16 inch to 1/2 inch thick corrugated aluminum plate. The top view of the light weight three hatch top slab 19 and the light weight four hatch top slab 18 is provided in FIGS. 3B and 3A respectively.

Green Wet Well FIG. 8 Structural Weight

In order to calculate the structural weight of the module FIGS. 1 & 2 with an inner diameter $D_i$, the Wall Unit Segment 24 (herein after W.U.S.) has been selected. FIG. 4 provides cross section views of a W.U.S. 24 for module H FIG. 1 and modules M & L FIG. 2. The W.U.S. is a vertical slice of the wall that has the following dimensions:

1—Length: The length is the same as the height of the module FIGS. 1 & 2 which is 6 feet.
2—Width: The length of the arc of the inner circle of the wet well with a central angle of $\alpha = 2\pi/D$ radian, (360°/D degree central angle). This width is relatively constant in all wet wells regardless of diameter $D_i$ and it is equal to 3.14 feet.
3—Thickness: The thickness is 8" for all H modules FIG. 1 and 7" for all L & M modules FIG. 2.

For each type of module FIGS. 1 & 2, the weight of the W.U.S. 24 is constant and independent of the well diameter. Modules H, M and L FIGS. 1 & 2 have different wall construction measurements and therefore, will have different constant values for the weight or their respective W.U.S. 24.

Horizontal and Vertical Stress on the Wet Well Wall

FIG. 5 presents a basic outside surface view of a W.U.S. 24. Due to water pressure inside the wet well, the unit is subject to two dimensional tensile stresses. Horizontal stress bx, also known as "hoop" stress, works to rupture the well with vertical cracks parallel the well vertical axis. Horizontal stress bx is directly related to the diameter of the wet well. Vertical stress, by, or bending stress, is generated by the uniform load of water pressure on the well wall. Vertical stress by tries to rupture the wet well with horizontal cracks. Both horizontal stress bx and vertical stress by have been analyzed and the required reinforcement to compensate these stresses for each module FIGS. 1 & 2 has been calculated and provided in Tables 3A through 3D and Tables 4A through 4F.

Buoyancy—the Buoyant Force of Water on the Wet Well

When the wet well is installed underground at a site having a high underground water table, the buoyancy effect of water is to generate uplift force that works to push the wet well out of the ground.

This design applies the highest uplift force possible in the calculations. Buoyancy force is a function of both the underground water level and the water level inside of the wet well. The most extreme condition occurs when the wet well is empty and the site is flooded.

Section 1—Buoyancy in Traditional Pre-Cast Wet Wells 17

Figure 6:
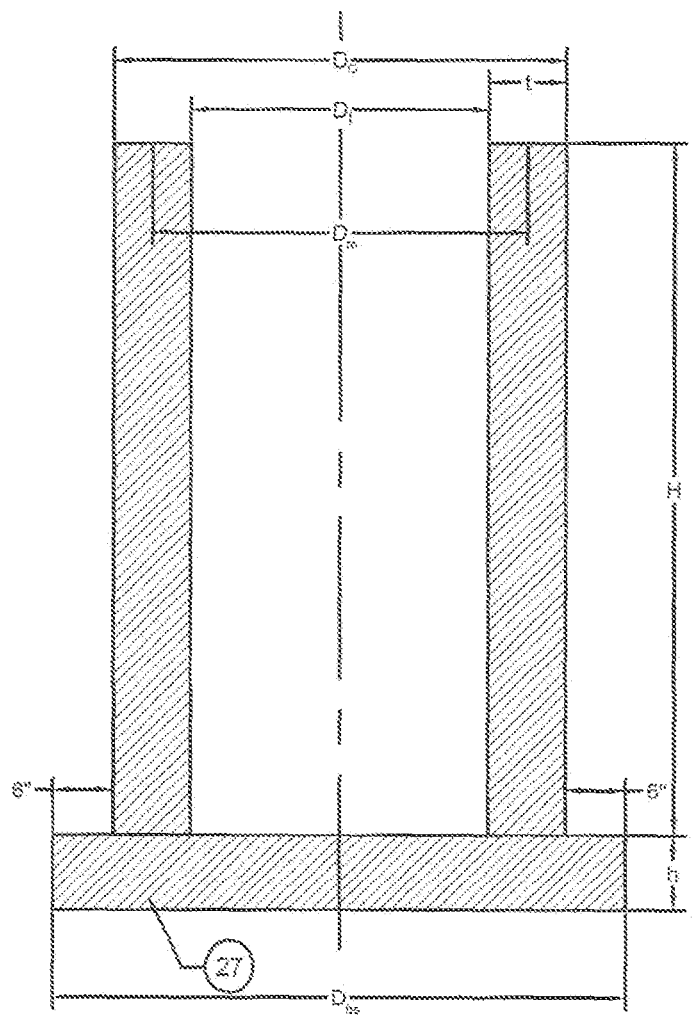
FIG. 6 depicts a view of an empty traditional (PRIOR ART) pre-cast installed wet well in a saturated flooded site.

FIG. 6 provides a view of an empty traditional pre-cast installed wet well 17 in a saturated flooded site where:
$D_i$ is the inner diameter of the well 17 in feet,
$D_o$ is the outer diameter of the well 17 in feet,
$D_{bs}$ is the bottom slab 27 diameter in feet,
$D_m$ is the mean of the inner and outer diameter in feet,
t is the wall thickness in feet,
H is the depth of the well 17 in feet and
h is the thickness of the bottom slab 27 in feet.

Not shown in FIG. 6 but used in formulas:
$\rho_c$ is the specific weight of concrete in air measured in lb/ft$^3$,
$\rho_{cw}$ is the specific weight of concrete in water measured in lb/ft$^3$ and
$\rho_w$ is the specific weight of water measured in lb/ft$^3$.

A—Structural Weight

Wet well structural weight could cancel out all or part of buoyant force. In the calculation of the structural weight, the weight of the top slab should not be included so that structural weight=bottom slab 27 weight+cylinder weight yielding Equation (1):

$$W_{well} = \rho_c \times [(\pi \times D_{bs}^2 \times h/4) + \pi \times D_m \times t \times H]$$

$$W_{well} = \pi \times \rho_c/4 \times (h \times D_{bs}^2 + 4t \times H \times D_m) \quad (1)$$

B—Buoyant Force

The buoyant force of water corresponding to the worst condition for design parameters is given by Equation (2):

$$\vec{B} = \rho_w \times [(\pi \times D_{bs}^2 \times h/4) + \pi D_o^2 \times H/4] = \pi/4 \times \rho_w \times (D_{bs}^2 \times h + D_o^2 \times H) \quad (2)$$

C—Uplift Force

The net uplift force that pushes the wet well 17 out of the ground is calculated by Equation (3):

$$\vec{F}_{UPL} = \vec{B} - \vec{w} \quad (3)$$

Equation (4):

$$\vec{F}_{UPL} = \pi/4 \times \rho_w \times (D_{bs}^2 \times h + D_o^2 \times H) - \pi/4 \times \rho_c \times (D_{bs}^2 \times h + 4t \times H \times D_m)$$

$$\vec{F}_{UPL} = \pi/4 \times \rho_w \times D_o^2 \times H - \pi/4 \times [(\rho_c - \rho_w) \times D_{bs}^2 \times h + 4 \times \rho_c \times t \times H \times D_m]$$

$$\vec{F}_{UPL} = \pi/4 \times [\rho_w \times D_o^2 \times H - (\rho_c - \rho_w) \times D_{bs}^2 \times h - 4 \rho_c \times t \times H \times D_m] \quad (4)$$

D—Dead Weight as the Counter Balance for Uplift

To cancel the effect of uplift force, the traditional method is to add additional concrete to the structure.

Let the $\vec{F}_{UPL}$=in equation 4 above be equal to zero and Equation (5) be:

$$\vec{F}_{UPL} = (\rho_c - \rho_w) \times V_{con} \text{ ft}^3 \text{ or}$$

$$\vec{F}_{UPL} = (\rho_c - \rho_w) \times V_{conyard}^3 \times 27 \text{ ft}^3/\text{yard}^3 \quad (5)$$

Substituting equation 4 in 5 will result in Equation (6):

$$V_{conyard} = \pi/108 \times [\rho_w \times D_o^2 \times H - (\rho_c - \rho_w) \times h \times D_{bs}^2 - 4 \times \rho_c \times t \times H \times D_m]/(\rho_c - \rho_w) \quad (6)$$

Where:
$D_o$, $D_{bs}$, $D_m$, h, H, t, have been explained above and
$V_{conyard}^3$ is the volume of concrete in cubic yards as counter balance downward force to cancel the uplift force.

For example, let the following be the dimensions for the selected wet well 17 applied to FIG. 6:
$D_i$=8.00 feet
$D_o$=9.67 feet
$D_{bs}$=11.00 feet
$D_m$=8.83 feet
t=0.83 feet
H=24.00 feet
h=1.00 feet
$\rho_c$=150.00 lb/ft$^3$ (specific weight of concrete in air)
$\rho_{cw}$=87.80 lb/ft$^3$ (specific weight of concrete in water)
$\rho_w$=62.20 lb/ft$^3$ (specific weight of water)

Substituting the numerical values in equation 6, the amount of required concrete in cubic yards is calculated:

$$V_{conyard}{}^3 = (3.14/108) \times [62.2^{lb/ft^3} \times 24^{ft} \times 9.67^{2\,ft^2} - (150 - 62.2) \times 1^{ft} \times 11^{2\,ft^2} - 4 \times 150^{lb/ft^3} \times 0.83^{ft} \times 24^{ft} \times 8.83^{ft}]/(150^{lb/ft^3} - 62.2^{lb/ft^3})$$

$$V_{conyard}{}^3 = (3.14/108) \times [139{,}590 - 10{,}623.8 - 105{,}536]/87.8^{lb/ft^3}$$

$$V_{conyard}{}^3 = 7.76 \text{ yards}^3$$

Section 2—Buoyancy in Green Wet Wells FIG. 8

As mentioned and as shown in FIG. 8, the Green Wet Wells FIG. 8 are made from stacks of several units called modules FIGS. 1 & 2 and a bottom slab 27 which will be casted in place. Design conditions like the traditional concrete wet well 17 are subject to the highest uplift force. The highest uplift force occurs when the ground is saturated, additional flooding occurs and the wet well 17 is completely empty. Since the structural weight of the module FIGS. 1 & 2 varies with the depth of installation, it is necessary to consider the following steps:

Step 1—Calculate the weight, buoyant force and uplift force on the modules FIGS. 1 & 2;

Step 2—Calculate the total weight, buoyant force and uplift force on the Green Recycled Material Component Wet Well cylinder 29;

Step 3—Calculate the total weight, buoyant force and uplift force on the Green Recycled Material Component Wet Well FIG. 8 so that the calculation includes the Green Recycled Material Component Wet Well cylinder well 29 and the bottom slab 27;

Step 4—Calculate the maximum uplift force and the number of mechanical anchors 25 and 26 in FIG. 8 to counter balance the uplift force on the wet well FIG. 8; and Step 5—Calculate the uplift force on the modules' FIGS. 1 & 2 joints and design the joints' module connecting bolts 15 to overcome the joint separating forces.

Details of Step 1—Green Module's FIGS. 1 & 2 Weight, Buoyant Force and Uplift Force 1-A Green Module's FIGS. 1 & 2 Structural Weight 1-A-1 Green Modules FIGS. 1 & 2 with Circular Cross Sections The most common Green Recycled Material Component Wet Well design applies to wet wells with circular cross sections (round wells). The weight of the module FIGS. 1 & 2 is a function of the installation depth and diameter.

Let: $(\rho_{W.U.S.})_J$ be the weight of the W.U.S. of a module FIGS. 1 & 2 that is installed in the depth of "J", where J can be 1, 2, 3, 4 or 5 corresponding to depths of 6 ft, 12 ft, 18 ft, 24 ft and 30 ft of water. In the various Tables, those modules FIGS. 1 & 2 of J1 to J5 are also referred to as modules L1, L2, M1, M2 and H respectively.

And let: $D_i$ be the inner diameter of the cross section circle in feet. Common values of $D_i$ are 6 ft, 8 ft, 10 ft and 12 ft. The general equation for the structural weight of modules FIGS. 1 & 2 with inner diameter of $D_i$ and installed at a depth of J will yield Equation (7) Table 6A:

$$W_{i,L}{}^{lb}\text{module} = D_i \times (\rho_{W.U.S.})_J \quad (7)$$

The numerical values for $(\rho_{W.U.S.})_J$ (J=1 to 5) are given in Table 2.

1-A-2 Green Modules FIGS. 1 & 2 with Oval Cross Sections

The weight of an oval module FIGS. 1 & 2 installed at the depth corresponding to J with the inner diameter of $D_i$ and straight walls of "L" in feet can be calculated by using the unit weights of $(\rho_{W.U.S.})_J$ and $(\rho_{W.L.F.})_J$.

Where:

$(\rho_{W.U.S.})_J$ is the weight of a W.U.S. having an installation depth of J and $(\rho_{W.L.F.})_J$ is the weight of one linear foot of the straight wall having an installation depth of J.

The general equation of oval Green modules FIGS. 1 & 2 is given by Equation (8) Table 6A:

$$W_{i,L}{}^J \text{oval in pounds} = D_i \times (\rho_{W.U.S.})_J + 2L \times (\rho_{W.L.F.})_J \quad (8)$$

The numerical values of $(\rho_{W.U.S.})_J$ and $(\rho_{W.L.F.})_J$ are given in Table 2.

1-B Green Modules' FIGS. 1 & 2 Buoyant Force

The buoyant force of water associated with the worst site condition, that being a saturated and flooded site with a completely empty wet well FIG. 8, will be calculated for circular and oval modules FIGS. 1 & 2.

1-B-1 Buoyant Force on Green Modules FIGS. 1 & 2 with Circular Sections

The general equation for the buoyant force of water on a green module FIGS. 1 & 2 with a circular cross section is Equation (9) Table 6B:

$$\vec{B}_{circular\,mode} = \pi/4 \times H \times \rho_w \times (D_i + 2t)^2 \quad (9)$$

Where:

H is the height of the module FIGS. 1 & 2 in feet, $D_i$ is the inner diameter of the circle's cross section in feet, t is the thickness of the module's FIGS. 1 & 2 wall in feet and $\rho_w$ is the specific gravity of water in $lbs/ft^3 = 62.2$ $lb/ft^3$.

1-B-2 Buoyant Force on Oval Modules FIGS. 1 & 2

The general equation of buoyant force on a module FIGS. 1 & 2 with an oval cross section having straight walls of L in feet is Equation (10) Table 6B:

$$\vec{B}_{oval} = \pi/4 \times H \times \rho_w \times (D_i + 2t)^2 + \rho_w \times H \times L \times (D_i + 2t)$$

$$\vec{B}_{oval} = \rho_w \times H(D_i + 2t)[\pi/4(D_i + 2t) + L] \quad (10)$$

Where:

H, $D_i$, t and $\rho_w$ have the same values as those given in step 1-B-1 and L is the length of straight wall in feet.

1-C Uplift Force on Green Wet Well Modules FIGS. 1 & 2

The uplift force on submerged and empty modules FIGS. 1 & 2 can be calculated by General Equation (11) as follows:

$$\vec{F}_{UPLJ} = \vec{B}_J - \vec{w}_J \quad (11)$$

1-C-1 Uplift Force on Circular Green Module J

Uplift force on module J having a circular cross section and an inner diameter $D_i$ can be calculated by substituting equations (7) and (9) in equation (11) to arrive at Equation (12) Table 6A:

$$\vec{F}_{module\,J\,uplift} = \pi/4 \times H \times \rho_w \times (D_i + 2t)^2 - D_i \times (\rho_{W.U.S.})_{J(J=1\,to\,J)} \quad (12)$$

1-C-2 The Uplift Force on Oval Module J

The uplift force on oval module J can be calculated by substituting equations (8) and (10) in equation (11) resulting in Equation (13) Table 6C:

$$\vec{F}_{module\,J\,uplift} = \rho_w \times H(D_i + 2t)[\pi/4(D_i + 2t) + L] - D_i \times (\rho_{W.U.S.})_J - 2L \times (\rho_{W.L.F.})_J \quad (13)$$

Where:

J is 1 to 5 as indicated in Table 4 A,

L is the length of the straight wall in feet, $(\rho_{W.U.S.})_J$ is the unit weight of the Wall Unit Segment in pounds and $(\rho_{W.L.F.})_J$ is the weight of one linear foot of straight wall of oval module J.

The numerical values for $(\rho_{W.U.S.})_J$, $(\rho_{W.L.F.})_J$, $\vec{W}_{circular(i,J)}$, $\vec{W}_{oval(i,J)}$, $\vec{B}_{circular(i)}$, $\vec{B}_{oval(i,L)}$, $\vec{F}_{circular\ uplift(i,J)}$, and $\vec{F}_{oval(i,L,J)}$ are calculated for (J=1 to 5) and are provided in Tables 4A and 4B.

Details of Step 2—Green Wet Well FIG. 8 Cylinder's 29 Weight, Buoyant Force and Uplift Green Wet Well cylinders 29 are made using stacks of 1 to J modules FIGS. 1 & 2 with any inner diameter of $D_i$.

2-A Green Wet Well Cylinders' 29 Structural Weight

The structural weight of the green cylinder 29 is the summation weight of J modules FIGS. 1 & 2 (J=1 to J) with an inner diameter of $D_i$.

2-A-1 Weight of a Circular Green Wet Well Cylinder 29

The structural weight of a cylinder made from "J" circular modules FIGS. 1 & 2 with any inner diameter $D_i$ is given by Equation (14) Table 7B:

$$W^{lb}_{circularcylinder} = \sum_{J=1}^{J=J} D_i \times (\rho_{W.U.S})_J = D_i \times \sum_{J=1}^{J=J} (\rho_{W.U.S.})_J \quad (14)$$

Where:
$(\rho_{W.U.S.})_J$ is the module's J unit weight of a Wall Unit Segment.

2-A-2 Weight of an Oval Green Wet Well Cylinder 29

The structural weight of a cylinder 29 made from a J oval module FIGS. 1 & 2 with any inner diameter $D_i$ and any L will be Equation (15) Table 7B:

$$W^{lb}_{ovalcylinder} = \sum_{J=1}^{J=J} (D_i \times (\rho_{W.U.S})_J + 2L \times (\rho_{W.L.F.})_J \quad (15)$$

$$W^{lb}_{ovalcylinder} = D_i \times \sum_{J=1}^{J=J} (\rho_{W.U.S})_J + 2L \times \sum_{J=1}^{J=J} (\rho_{W.L.F.})_J$$

Where:
$(\rho_{W.U.S.})_J$ is the module's J unit weight of a Wall Unit Segment and
$(\rho_{W.L.F.})_J$ is the module's J unit weight of one linear foot of the wall.

2-B Green Wet Well Cylinder 29 Buoyant Force

The buoyant force of water on a green cylinder 29 made of J modules FIGS. 1 & 2 with any inner diameter of $D_i$ can be calculated by summation of the buoyant force of each module FIGS. 1 & 2.

2-B-1 Buoyant Force of a Circular Green Wet Well Cylinder 29

The buoyant force of water on circular cylinders made of J modules FIGS. 1 & 2 with any inner diameter of $D_i$ can be calculated by summation of the buoyant force of each module FIGS. 1 & 2 using Equation 9 to result in Equation (16) Table 7C:

$$\vec{B}^{lb}_{circular\ cylinder\ J} = \sum_{J=1}^{J=J} \pi/4 \times H \times \rho_W \times (D_i + 2t_J)^2 \quad (16)$$

$$\vec{B}^{lb}_{circular\ cylinder\ J} = \pi/4 \times H \times \rho_W \sum_{J=1}^{J=J} (D_i + 2t_J)^2$$

Where:
$t_J$ is the wall thickness of module J in feet,
H is the height of the module FIGS. 1 & 2 in feet,
$D_i$ is the inner diameter of the circle's cross section in feet and
$\rho_w$ is the specific gravity of water in lbs/ft³=62.2 lb/ft³.

2-B-2 Buoyant Force of an Oval Green Wet Well Cylinder 29

The buoyant force acting on a Green Wet Well cylinder 29 with an oval cross section made from J oval modules FIGS. 1 & 2 can be calculated by summation of the buoyant forces on each module FIGS. 1 & 2 using Equation (10) to obtain Equation (17) Table 7C:

$$\vec{B}^{lb}_{oval\ cylinder\ J} = \sum_{J=1}^{J=J} \rho_W \times H(D_i + 2t_J)[\pi/4(D_i + 2t_J) + L] \quad (17)$$

$$\vec{B}^{lb}_{oval\ cylinder\ J} = \rho_W \times H \sum_{J=1}^{J=J} (D_i + 2t_J)[\pi/4(D_i + 2t_J) + L]$$

2-C Green Cylinder 29 Uplift Force

The uplift force on the Green Wet Well cylinder 29 results from the cylinder 29 structural weight and buoyant forces acting on the cylinder 29 vertically but in opposite direction of each other. Cylinder 29 uplift force can be obtained by subtracting the cylinder 29 weight from its buoyant force as General Equation (18) Table 7C:

$$\vec{F}_{cylinder\ J} = \vec{B}_{cylinder\ J} - \vec{W}_{cylander\ J} \quad (18)$$

2-C-1 Uplift Force on Circular Cylinders 29

The uplift force on a green cylinder 29 made from J modules FIGS. 1 & 2 with any inner diameter of $D_i$ and a wall thickness of $t_J$ can be calculated by Equation (19) Table 8B:

$$\vec{F}^{lb}_{cylinder\ J} = \pi/4 \times H \times \rho_W \sum_{J=1}^{J=J} (D_i + 2t_J) - D_i \times \sum_{J=1}^{J=J} (\rho_{W.U.S.})_J \quad (19)$$

Where:
J is the number of modules FIGS. 1 & 2 in a stack of cylinders (J=1 to J).

2-C-2 Uplift Force on Oval Cylinders 29

The uplift force acting on an oval cylinder 29 with any inner diameter and straight wall of can be evaluated by Equation (20):

$$\vec{F}_{oval\ cylinder\ J} = \rho_W \times H \sum_{J=1}^{J=J} (D_i + 2t_J) \times [\pi/4(D_i + 2t_J) + L] - \quad (20)$$

$$D_i \sum_{J=1}^{J=J} (\rho_{W.U.S.})_J - 2L \times \sum_{J=1}^{J=J} (\rho_{W.L.F.})_J$$

Where:
$\vec{F}_{oval\ cylinder\ J}$ is the uplift force acting on oval cylinders 29 made of J number of modules FIGS. 1 & 2 in pounds.

The values of structural weights, buoyant force and uplift for Green Wet Well cylinders 29 are given in Tables 5A, 5B and 5C.

Details of Step 3—Green Wet Well FIG. 8 Structural Weight, Buoyant Force and Uplift A Green Wet Well FIG. 8 is made from a stack of units called modules FIGS. 1 & 2 as shown in FIG. 8. The modules FIGS. 1 & 2 form the cylinder section 28 in FIG. 8. The Green Wet Well FIG. 8 will be made by closing the bottom of the open cylinder 29 with a bottom slab 27 so that the combined cylinder 29 and bottom slab 27 are integrated parts of the Green Wet Well FIG. 8.

3-A Wet Well Bottom Slab 27 Weight

The effect of the bottom slab 27 in the wet well FIG. 8 will be:
a) to enclose the bottom of the cylinder 29 and
b) to counter balance part of the uplift force on the well FIG. 8.

3-A-1 Circular Green Wet Well Bottom Slab 27

In all wet wells, whether the traditional pre-case concrete design 17 or the Green Recycled Material Component Wet Well design FIG. 8, the slab 27 diameters should be larger than the cylinder's outer edge diameter by 12 inches to 20 inches for better uplift balance.

3-A-1a Weight of the Circular Bottom Slab 27

The structural weight of the circular bottom slab 27 is given by Equation (21):

$$\vec{w}_{circular\ bottom\ slab}^{lb} = \pi/4 \rho_c \times h \times D_{bs}^2 = \pi/4 \times 150\ lbs/ft^3 \times h \times D_{bs}^2$$

$$\vec{w}_{circular\ bottom\ slab}^{lb} = 118 \times h \times D_{bs}^2 \quad (21)$$

where:
Dbs is the diameter of the bottom slab 27 in feet,
h is the thickness of the bottom slab 27 in feet, usually 1 foot and
$\rho_c$ is the specific gravity of concrete, $\rho_c = 150$ pounds per cubic foot.

3-A-1b Weight of the Oval Bottom Slab 27

The structural weight of the bottom slab 27 of an oval wet well FIG. 8 is given by Equation (22):

$$W_{bottom\ slab\ oval}^{lb} = \rho_c \times h \times (\pi/4 \times D_{bs}^2 + L \times D_{bs})$$

$$W_{bottom\ slab\ oval}^{lb} = \rho_c \times h \times D_{bs} \times (\pi/4 \times D_{bs} + L) \quad (22)$$

Where:
$\rho_c$ is the specific gravity of concrete, $\rho_c = 150$ pounds per cubic foot,
h is the thickness of the bottom slab 27 in feet, usually 1 foot,
$D_{bs}$ is the diameter of the bottom slab 27 in feet, $D_{bs} = D_i + 2 \times (t+k)$,
t is the thickness of the well cylinder 29,
k is the uplift friction key, k=6 inches to 10 inches,
L is the length of the straight wall of the oval module FIGS. 1 & 2 and
$W_{bottom\ slab\ oval}^{lb}$ is the weight of the bottom slab 27 in pounds.

3-B Buoyant Force on the Bottom Slab 27

The buoyant force on the bottom slab 27 for wet wells FIG. 8 is given by the cross section of the circular and the oval.

3-B-1 Buoyant Force on the Circular Bottom Slab 27

Buoyant force on the circular bottom slab 27 is given by Equation (23):

$$\vec{B}_{circular\ bottom\ slab}^{lb} = \rho_w \times h \times (\pi/4 \times D_{bs}^2) = \pi/4 \times \rho_w \times h \times D_{bs}^2 \quad (23)$$

3-B-2 Buoyant Force of the Oval Bottom Slab 27 is Given by Equation (24):

$$\vec{B}_{bottom\ slab\ oval}^{lb} = \rho_w \times h \times D_{bs} \times (\pi/4 \times D_{bs} + L) \quad (24)$$

3-C Uplift Force on the Wet Well Bottom Slab 27 Equation (25):

$$\vec{F}_{bs} = \vec{B}_{bs} - \vec{w}_{bs} \quad (25)$$

3-C-1 Uplift Force on the Circular Bottom Slab 27

The uplift force on the circular bottom slab 27 can be obtained by substituting the Equations (23) and (21) in Equation (25) resulting in Equation (26):

$$\vec{F}_{bs} = \pi/4 \times \rho_w \times h \times D_{bs}^2 - \pi/4 \times \rho_c \times h \times D_{bs}^2$$

$$\vec{F}_{bs} = \pi/4 \times h \times D_{bs}^2 \times (\rho_w - \rho_c)$$

$$\vec{F}_{bs} = \pi/4 \times (62.4 - 150) \times h \times D_{bs}^2$$

$$\vec{F}_{bs} = (-)87.6 \times h \times D_{bs}^2 \quad (26)$$

Where:
$\rho_w, \rho_c$ are the specific gravity of water and concrete having values of 62.4 pounds per cubic foot and 150 pounds per cubic foot respectively.

3-C-2 Uplift Force on the Oval Bottom Slab 27

The uplift force on the bottom slab 27 of an oval wet well FIG. 8 can be calculated by substituting Equations (24) and (22) in Equation (25) results in Equation (27):

$$\vec{F}_{bs\ oval} = \rho_w \times h \times D_{bs} \times (\pi/4 \times D_{bs} + L) - \rho_c \times h \times D_{bs} \times (\pi/4 \times D_{bs} + L)$$

$$\vec{F}_{bs\ oval} = h \times D_{bs} \times (\pi/4 \times D_{bs} + L) \times (\rho_w - \rho_c)$$

$$\vec{F}_{bs\ oval} = (-)87.6 \times h \times D_{bs} \times (\pi/4 \times D_{bs} + L) \quad (27)$$

3-D Weight, Buoyant Force and Uplift Force on the Complete Wet well (Cylinder Plus the Bottom Slab) FIG. 8

The cylinder 29 is enclosed by adding the bottom slab 27 thereby forming the complete wet well FIG. 8. The Green Wet Well FIG. 8 could have circular or oval cross sections.

3-D-1 Weight of the Circular Green Wet Well FIG. 8

The structural weight of a circular wet well FIG. 8 can be obtained by adding the cylinder 29 weight and the bottom slab 27 weight using Equations (14) and (21) and arriving at Equation (28):

$$W_{circular\ well}^{lb} = D_i \times \sum_{J=1}^{J=J} (\rho_{W.U.S.})_J + 118 \times h \times D_{bs}^2 \quad (28)$$

Where:
$W_{circular\ well}^{lb}$ is the structural weight of circular wet well (cylinder+bottom slab) FIG. 8 in pounds,
$D_i$ is the inner diameter of the well FIG. 8 in feet,
$(\rho_{W.U.S.})_J$ is the unit weight of a Wall Unit Segment of module J with a width of 3.14 feet, height of H and thickness of t, $$\sum_{J=1}^{J=J} (\rho_{W.U.S.})_J$$

is the summation of Wall Unit Segment weights of J number of modules FIGS. 1 & 2,
h is the thickness of the bottom slab 27 in feet and
$D_{bs}$ is the bottom slab 27 diameter in feet.

3-D-2 Weight of an Oval Green Wet Well FIG. 8

The structural weight of an Oval Green Wet Well FIG. 8 can be calculated by adding the weight of the bottom slab 27

(Equation 22) to the cylinder 29 weight (Equation 15) yielding Equation (29) given by:

$$W_{wet\ well\ oval}^{lb} = \rho_c \times h \times D_{bs} \times (\pi/4 \times D_{bs} + L) + \tag{29}$$

$$D_i \times \sum_{J=1}^{J=J} (\rho_{W.U.S.})_J + 2L \times \sum_{J=1}^{J=J} (\rho_{W.L.F.})_J$$

Where:

$\rho_c$, $\rho_w$ are the specific gravity of concrete and water having values of 150 pounds per cubic foot and 62.4 pounds per cubic foot respectively, $H$, $D_{bs}$, $D_i$, and $\sum_{J=1}^{J=J} (\rho_{W.U.S.})_J$ are the same as in 3-D-1, L is the width of the straight wall of the oval modules FIGS. 1 & 2 in feet and $$\sum_{J=1}^{J=J} (\rho_{W.L.F.})_J$$

is the summation of "weight of one linear foot of wall" of J number of modules and it is equal to: $[(\rho_{W.L.F.})_1 + (\pi_{W.L.F.})_2 + \ldots + (\rho_{W.L.F.})_J]$ 3-E Buoyant Force of Water on Complete Green Wet Wells FIG. 8

The general equation for the buoyant force on the Green Wet Well FIG. 8 can be found by adding the individual buoyant forces of the cylinder 29 and the bottom slab 27 together.

3-E-1 Buoyant Force on the Circular Green Wet Well FIG. 8

The buoyant force on the circular Green Wet Well FIG. 8 can be calculated by substituting Equations (16) and (23) into General Equation (30) resulting in Equation (31):

$$\vec{B}_{circular\ well\ J}^{lb} = \vec{B}_{circular\ cylinder\ J}^{lb} + \vec{B}_{circular\ bs\ J}^{lb} \tag{30}$$

$$\vec{B}_{circular\ well\ J}^{lb} = \pi/4 \times H \times \rho_W \sum_{J=1}^{J=J} (D_i + 2t_J)^2 + \pi/4 \times \rho_W \times h \times D_{bs}^2 \tag{31}$$

$$\vec{B}_{circular\ well\ J}^{lb} = \pi/4 \times \rho_W \left[ h \times D_{bs}^2 + H \times \sum_{J=1}^{J=J} (D_i + 2t_J)^2 \right]$$

3-E-2 Buoyant Force on the Green Oval Wet Well

The buoyant force of water acting on the Green Wet Well FIG. 8 is given in the general form of Equation (30). Substituting Equations (17) and (24) in General Equation (30) results in Equation (32) as follows:

$$\vec{B}_{oval\ well\ J}^{lb} = \rho_W \times H \sum_{J=1}^{J=J} (D_i + 2t_J)[\pi/4(D_i + 2t_J) + L] + \tag{32}$$

$$\rho_W \times h \times D_{bs} \times (\pi/4 \times D_{bs} + L)$$

$$\vec{B}_{oval\ well\ J}^{lb} = \rho_W \times$$

$$\left\{ h \times D_{bs} \times (\pi/4 D_{bs} + L) + H \sum_{J=1}^{J=J} (D_i + 2t_J)[\pi/4(D_i + 2t_J) + L] \right\}$$

3-F The Uplift Force on the Green Wet Well FIG. 8

The uplift force on complete circular and oval cross section Green Wet Wells FIG. 8 can be calculated by General Equation (33):

$$\vec{F}_{D\flat well\ uplift\ J}^{lb} = \vec{B}_{D\flat well\ J}^{lb} - W_{D\flat well\ J}^{lb} \tag{33}$$

3-F-1 Uplift Force on the Circular Green Wet Well FIG. 8

The uplift force acting on the Green Wet Well FIG. 8 made from "J" modules FIGS. 1 & 2 of circular sections and inner diameters of $D_i$ can be obtained by substituting Equations (31) and (28) into Equation (33) which leads to Equation (34):

$$\vec{F}_{circular\ well\ J} = \pi/4 \times \rho_W \left[ h \times D_{bs}^2 + H \times \sum_{J=1}^{J=J} (D_i + 2t_J)^2 \right] - \tag{34}$$

$$D_i \times \sum_{J=1}^{J=J} (\rho_{W.U.S.})_J - 118 \times h \times D_{bs}^2$$

3-F-2 Uplift Force on the Oval Green Wet Well FIG. 8

The general equation for uplift force on the oval wet well FIG. 8 can be obtained by substituting Equations (29) and (32) in Equation (33). The following Equation (35) is the general uplift force acting on an oval wet well FIG. 8 made from J number of oval modules FIGS. 1 & 2 with an oval bottom slab 27:

$$\vec{F}_{oval\ well\ J} = \rho_W \times \left\{ h \times D_{bs} \times (\pi/4 D_{bs} + L) + \tag{35} \right.$$

$$\left. H \sum_{J=1}^{J=J} (D_i + 2t_J)[\pi/4(D_i + 2t_J) + L] \right\} -$$

$$\left\{ \rho_c \times h \times D_{bs} \times (\pi/4 \times D_{bs} + L) + D_i \times \sum_{J=1}^{J=J} (\rho_{W.U.S.})_J + \right.$$

$$\left. 2L \times \sum_{J=1}^{J=J} (\rho_{W.L.F.})_J \right\}$$

With Equations (34) and (35), the uplift force acting on the submerged Green Wet Well FIG. 8 can be calculated to find the required counter balance force.

Step 4—The Maximum Uplift Force and the Number of Mechanical Anchors 25 and 26 Necessary to Counter Balance that Uplift Force on the Wet Well FIG. 8

The general equation of the Green Wet Well FIG. 8 uplift force is provided by Equation (33):

$$\vec{F}_{D\flat well\ uplift\ J}^{lb} = \vec{B}_{D\flat well\ J}^{lb} - w_{D\flat well\ J}^{lb} \tag{33}$$

In the above equation, the value of the structural weight as $W_{D\flat well\ J}^{lb}$ is constant after Green Wet Well FIG. 8 construction is completed. Therefore, the uplift force is directly related to the buoyant force. The maximum uplift occurs when the buoyant force is maximized. The maximum uplift force on the Green Wet Well FIG. 8 is given by Equation (34) for circular wet wells FIG. 8 and Equation (35) for oval wet wells FIG. 8. For any particular wet well FIG. 8, circular or oval, by inserting the numerical values in equations (34) and (35), the numerical value of the uplift can be calculated.

4-A Counter Balance Force on the Green Wet Well FIG. 8

The uplift force on wet wells FIG. 8 works to push the wet well FIG. 8 out of the ground. To prevent the upward movement of the wet well FIG. 8 due to uplift force, it is essential to counter balance the uplift force with a force having the same magnitude in the opposite direction. In traditional pre-cast concrete wet wells FIG. 6, this counter balance force is achieved by attaching extra concrete to the bottom slab 27. The required amount of concrete is given in cubic yards in section 1—Buoyancy in Traditional Pre-Cast Wet wells FIG. 6, sub section D—Dead Weight as the Counter Balance for Uplift. Equations (5) and (6) in that section are provided to calculate the volume of concrete in cubic yards necessary to counter balance the uplift force.

4-B Mechanical Anchors 25 and 26 as Counter Balancing Force

In the Green Recycled Material Component Wet Well FIG. 8, the goal is to stay green as much as possible by trying to maximize the use of recyclable materials and minimize non-recyclable materials used in the construction of the wet well FIG. 8. For this reason, the Green Wet Well FIG. 8 has been designed with reusable, recyclable mechanical anchors 25 and 26 instead of non-recyclable dead man concrete. A vast variety of mechanical anchors 25 and 26 with all ranges of capacity can be found in today's market. For proper selection of an anchor 25 and 26, the designer needs to search the variety of products and select the one that serves the project most effectively. In the design of the Green Wet Well FIG. 8, one mechanical anchor 25 and 26 has been selected as the standard and will be a shelf item for all Green Wet Wells FIG. 8.

4-C Standard Anchor 25 & 26 Having 40,000 Pound Capacity

Figure 7:
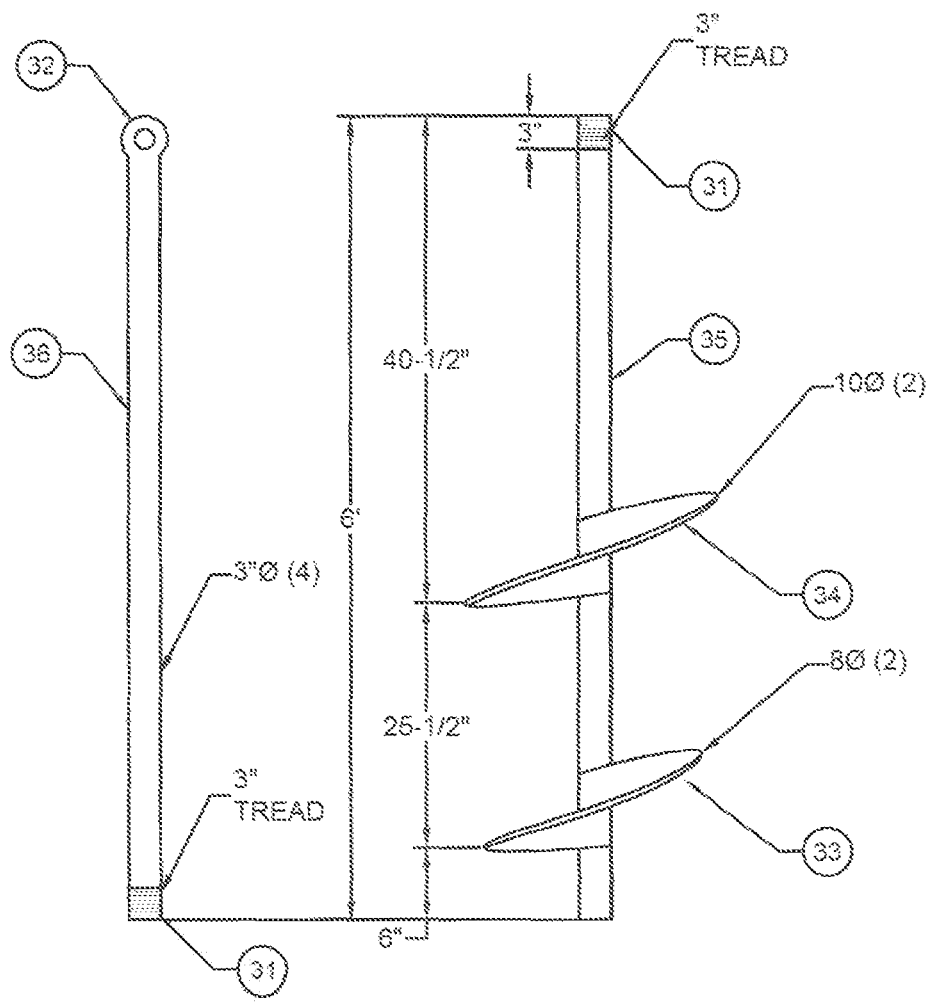
FIG. 7 depicts the components of the anchor system according to certain aspects of the invention.

These mechanical anchors 25 & 26, shown in detail in FIG. 7, have the following characteristics:
(1) A low pitch helical steel cutting blade with 8 inch diameter and dual cutting edges 33,
(2) A low pitch helical steel cutting blade with 10 inch diameter and dual cutting edges 34,
(3) Seamless steel pipe 31, six feet in length and three inches in diameter with thread 31 for extension at the end,
(4) Extension pipe 36, same as in (3), six feet in length and three inches in diameter with thread 31 at one end and an eye 32 or eye nut at the other end,
(5) 100% reusable/recyclable materials and
(6) a minimum 40,000 pound axial compression load capacity with 50% of capacity (20,000 pounds) to l be used as the conservative allowable force in the design.

4-D Required Number of Anchors 25 and 26

After uplift force of $\vec{F}$ has been calculated by using Equations (34) and (35), the required number of standard anchors 25 and 26 can be calculated by Equation (36):

$$N = \vec{F}^{lb}/40{,}000 \text{ lbs} \tag{36}$$

Where:
N is the required number of anchors 25 and 26 that are needed to counter balance the uplift force (rounded up).

FIG. 8 shows the method of anchoring a Green Wet Well FIG. 8 made of four modules FIGS. 1 & 2.

Details of Step 5—Uplift Force on Module FIGS. 1 & 2 Joints and Joint Fastening Module Connecting Bolts 15 in Green Wet Wells FIG. 8

The Green Wet Wells FIG. 8 are made from stacks of J modules FIGS. 1 & 2 (1 to J) having flanges connected together by module connecting bolts 15. The point where two flanges from two modules FIGS. 1 & 2 are connected together will be called the module's FIGS. 1 & 2 joint. In the previous topic, the general equations for weight, buoyant force and uplift force of individual modules FIGS. 1 & 2 were formulated and have been summarized in the tables. The uplift force on each module's FIGS. 1 & 2 joint, working to separate the modules FIGS. 1 & 2 from each other, can be calculated by using Equations (12) and (13) in order to calculate the number of required joint fastening module connecting bolts 15 in each joint and calculate the required number of mechanical anchors 25 and 26 as the counter balance force for an entire wet well FIG. 8.

5-A the Joint's Uplift Force in a Circular Wet Well FIG. 8

The uplift force on each module FIGS. 1 & 2 joint of J is the sum of the J uplift forces of J modules FIGS. 1 & 2 above that joint. First, the uplift force on each individual module FIGS. 1 & 2 is to be calculated using Equation (12). Then all uplift forces of the modules FIGS. 1 & 2 above that joint will be summed up to find the uplift force acting on that joint. The general equation for uplift force at the bottom joint of module J is given by Equation (37):

$$\vec{F}_{Joint,J(1 \text{ to } 5)} = \sum_{J=1}^{J=J} (\vec{B}_J - \vec{W}_J)_{(J=1 \text{ to } 5)} \tag{37}$$

Where:
$\vec{B}_J$ is the buoyant force on each module of J and
$\vec{W}_J$ is the weight of each module of J.

Substituting the values of $\vec{B}_J$ and $\vec{W}_J$, the following general equation for uplift force of the joints in the wet well FIG. 8 will be obtained and is Equation (38):

$$\vec{F}_{Joint,J} = \pi/4 \times H \times \rho_W \sum_{J=1}^{J=J} (D_i + 2t)^2 - \sum_{J=1}^{J=J} D_i (\rho_{W.U.S.})_J J_1^J \tag{38}$$

The joint uplift force calculated by Equation (38) works to separate two connected modules FIGS. 1 & 2 from each other. Module connecting bolts 15 have been used to neutralize this force. The module connecting bolts 15 also help seal the joint between two modules FIGS. 1 & 2. In Green Lift Stations, module connecting bolts 15 are stainless steel or hot deep galvanized steel ⅜" bolts, flat washers and nuts with allowable force of 1500 lbs/bolt.

Table 8 identifies the uplift for each module FIGS. 1 & 2, the uplift force on each joint and Table 8C identifies the number of module connecting bolts 15 required.

5-B Mechanical Anchor and Anchor Location FIG. 8

Figures 8A, 8B:
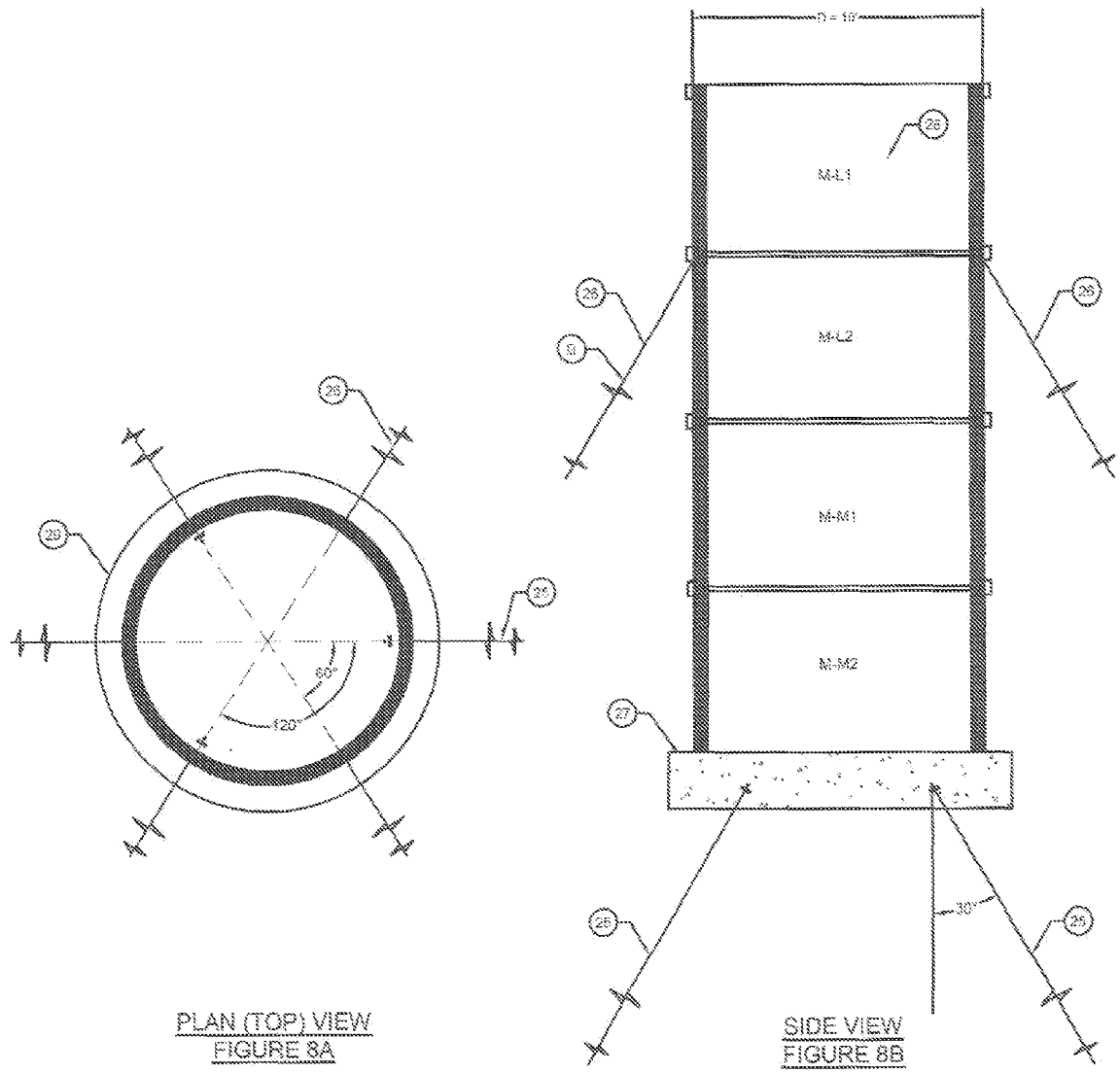
FIG. 8A provides a top view of the Green Recycled Material Component Wet Well with emphasis on the positioning of the anchoring system.
FIG. 8B provides a side view of the Green Recycled Material Component Wet Well with emphasis on the positioning of the anchoring system.
Figure 9:
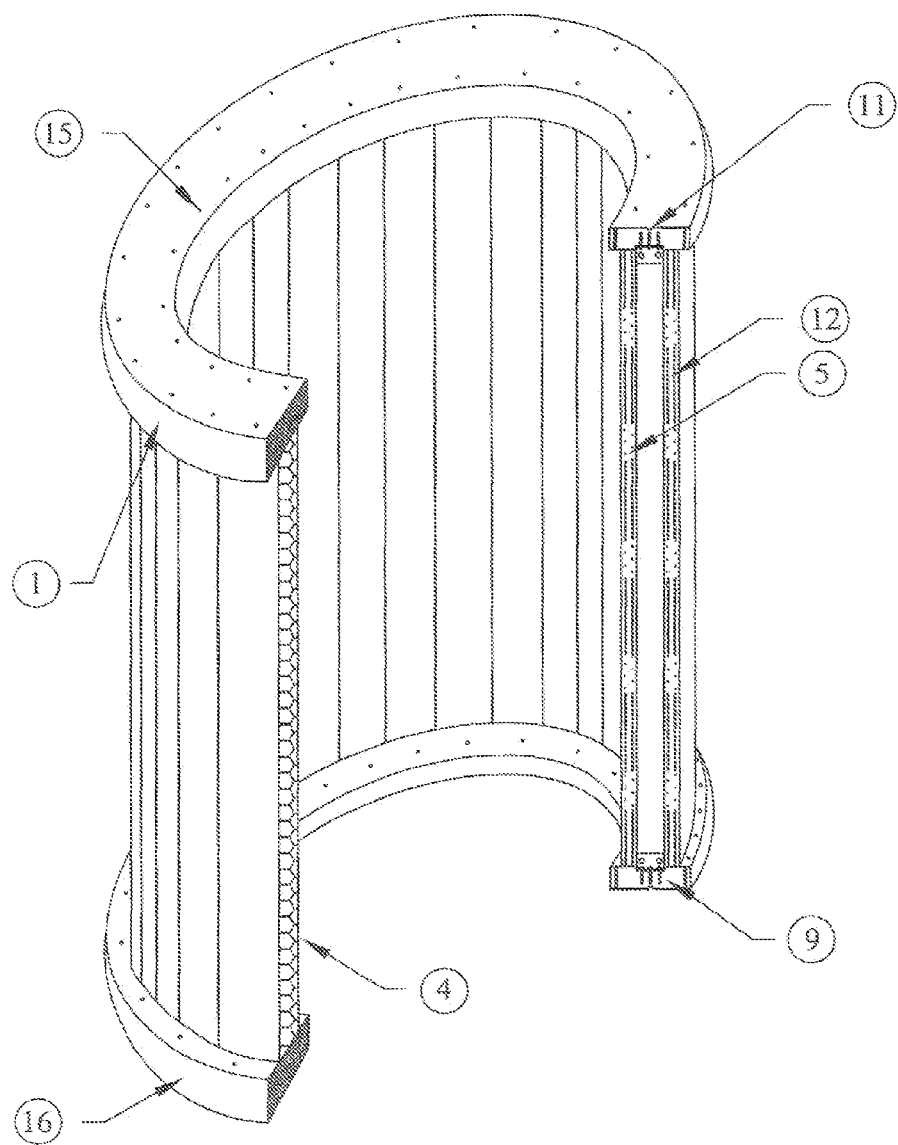
FIG. 9 depicts a 90 degree cut views of two vertical members. The drawing also depicts the positions of vertical members in a circular module, the top and bottom frames, space refill, inner surface stucco layer, outer surface reinforcing wire mesh, angle fastening screws and vertical member connecting bolts which are all depicted in FIG. 1 and FIG. 2 but portrayed in vertical cross section views of the single vertical member.

In Green Wet Wells FIG. 8, the uplift force of the buoyant force of water will be neutralized by mechanical anchors 25 and 26. Section 4-C identifies the composition of the mechanical anchors FIG. 7 and section 4-D provides the equation to calculate the number of anchors 25 and 26 required to neutralize the uplift force on the wet well FIG. 8. FIG. 8A shows the side view of the location of the anchors and FIG. 8B shows the top view of the anchored wet well.

1 Bottom slab anchors 25 and top anchors 26 are positioned as shown in FIG. 8A with the top anchors 26 installed at the elevation 6 feet to the bottom frame of module M-L1.

2 Half of the anchors will be bottom slab anchors 25 and the other half will be top anchors 26.

3 A minimum of three bottom slab anchors 25 should be installed at 120 degrees from each other.

4 It is recommended a minimum of 6 anchors 25 and 26 be used including 3 bottom slab anchors 25 and 3 top anchors 26 at the elevation of 6 feet from the surface.

5 When the minimum of 6 anchors 25 and 26 is used to neutralize the uplift force on a wet well, bottom slab anchors 25 are to be 120 degrees off each other and top anchors 26 are to be 120 degrees off each other but bottom slab anchors 25 are at 60 degrees in respect to top anchors 26 as shown in FIG. 8B.

I claim:

1. A circular or oblong green wastewater pump station wet well comprising:

modular cylindrical sections stacked to form predetermined well depths, the modular cylindrical sections further comprising identical top and bottom frames made of recycled plastic with an inner diameter equal to the desired wet well diameter, walls comprising vertical members constructed from recycled PVC materials, expanded polystyrene foam space refill that fills the space between the vertical members, connecting angle that connect the vertical members to the top and bottom frames and module stacking connecting bolts that connect the top module frames to vertically stacked bottom module frames, the vertical members having layers of wire mesh reinforcement attached to the inner and outer vertical member surface, the inner vertical member surfaces having stucco, stainless steel or galvanized sheet metal coverings and the outside surfaces covered by stucco;

wet well top and bottom slabs enclosing the wet well walls formed by the stacked modular cylindrical sections; and at least 3 mechanical ground anchoring system secured to at least the top modular cylindrical sections to resist buoyant forces on the wet well.

2. The circular or oblong green wastewater pump station wet well of claim 1 wherein the modular cylindrical sections have a length of 38 inches on the inner side and vertical members, the vertical members connect the top and bottom frames and have a width dimension of 2 inches, depth of 4 inches and height of 68.5 inches.

3. The circular or oblong green wastewater pump station wet well of claim 1 wherein the vertical members are placed in a 4 inch wide by ½ inch deep groove cut into the top and bottom frames and installed at 18.85 inches center to center of an inner circle of the frames.

4. The circular or oblong green wastewater pump station wet well of claim 1 wherein the wire mesh is cold worked welded wire mesh.

5. The circular or oblong green wastewater pump station wet well of claim 1 wherein the space refill is constructed from high density recycled expanded polystyrene foam of dimensions 18 inches wide, 4 inches deep, and 68 inches high and a curvature matching with a 4 inch width and 0.5 inch top and bottom frame grooves.

6. The circular or oblong green wastewater pump station wet well of claim 1 wherein the connecting angles are galvanized and have leg dimensions of 2.5 inches, thickness of 0.1875 inches and length of 3.75 inches with holes to attach the top and bottom frames to the vertical members.

7. The circular or oblong green wastewater pump station wet well of claim 1 wherein the mechanical ground anchoring system has a minimum 40,000 lb. axial compression load capacity and is a helical mechanical ground anchor.

* * * * *